United States Patent [19]

Joffre

[11] Patent Number: 5,287,361
[45] Date of Patent: Feb. 15, 1994

[54] PROCESS FOR EXTENDING THE OPERATING PERIOD OF A CIRCUIT WITH MOS COMPONENTS EXPOSED TO GAMMA RADIATION

[75] Inventor: Francis Joffre, Bures sur Yvette, France

[73] Assignee: Commissariat a l'Energie Atomique, France

[21] Appl. No.: 707,612

[22] Filed: May 30, 1991

[30] Foreign Application Priority Data

Jun. 12, 1990 [FR] France ............................. 90 07287

[51] Int. Cl.⁵ .............................................. G06F 11/00
[52] U.S. Cl. ...................................... 371/8.1; 371/9.1
[58] Field of Search ................. 371/8.1, 8.2, 9.1, 10.1, 371/11.1, 11.3; 250/492.2, 492.1

[56] References Cited

U.S. PATENT DOCUMENTS

| | | | |
|---|---|---|---|
| 3,691,376 | 9/1972 | Bauerlein et al. | 250/49.5 TE |
| 3,812,479 | 5/1974 | Witteles et al. | 340/173 LS |
| 4,587,429 | 5/1986 | Tomoda et al. | 250/375 |
| 5,022,027 | 6/1991 | Rosario | 371/12 |
| 5,023,874 | 6/1991 | Houston | 371/12 |
| 5,151,776 | 9/1992 | Wojnarowski et al. | 357/81 |

FOREIGN PATENT DOCUMENTS 2421493 10/1979 France.

*Primary Examiner*—Charles E. Atkinson
*Attorney, Agent, or Firm*—Pearne, Gordon, McCoy & Granger

[57] ABSTRACT

A process for extending the operating period of a circuit having MOS components exposed to gamma radiation wherein identical systems (10a, 10b, 10c) forming the circuit are switched on in turn. Exposure to radiation causes the MOS components to deteriorate. However, when one of the systems are "on", the others are "off" and are able to partly or fully recover their original characteristics. The systems are operated for a period of time shorter than that required for deterioration. Specific application to intervention robotics on nuclear sites and space installations.

4 Claims, 2 Drawing Sheets

PROCESS FOR EXTENDING THE OPERATING PERIOD OF A CIRCUIT WITH MOS COMPONENTS EXPOSED TO GAMMA RADIATION

BACKGROUND OF THE INVENTION

The present invention relates to a process for extending the operating period of a circuit having MOS components exposed to gamma radiation. It more particularly applies to circuits having MOS components (metaloxide semiconductor) and specifically CMOS components (compatible MOS) for controlling and commanding robots used for interventions on nuclear sites (nuclear power stations, reprocessing plants, etc.).

Gamma radiation causes deterioration in MOS component electronic circuits, the main effect being to create electron-hole pairs. These charges can accumulate in the components and give rise to electrical arcs, which destroy the component.

Circuits especially produced for resisting different radiation types are known. The components of these circuits are produced on insulating substrates known as SOS (silicon on shire). However, these circuits, which are produced for space or military uses, are hard to obtain and their cost is roughly one hundred ties greater than that of an equivalent circuit produced in a standard technology. In addition, the range of MOS/SOS circuits is limited and often the circuits proposed have performance characteristics inferior to those of conventional circuits.

Finally, circuits produced on the basis of MOS/SOS technology have in particular been developed for resisting the latch-up effect, so as to prevent internal short-circuits resulting from pulse-type, intense gamma radiation.

In civil applications relative to the nuclear field, the circuits must be able to resist not the latch-up effect, but rather continuous gamma radiation, which is not the most harmful when it is very intense.

The guarantee of completely satisfactory operation above an accumulated gamma radiation dose threshold of 100 krad is a standard specification in civil nuclear applications. MOS circuits objective under normal conditions of use.

SUMMARY OF THE INVENTION

The present invention obviates these various disadvantages. It makes it possible, for modest cost levels and with standard MOS components, to guarantee a satisfactory operation of a circuit below an accumulated gamma radiation dose threshold of 100 krad and even above this threshold for certain components.

The process according to the invention is based on known physical phenomena:

(1) MOS components deteriorate less rapidly under gamma radiation when they are not live;

(2) MOS components can partly or completely recover their original characteristics following irradiation, said recovery being a function of time and temperature.

The process according to the invention takes advantage of an unexpected phenomenon observed by the inventor. MOS components exposed to gamma radiation, but in the dead or off state, can partly or fully recover their original characteristics following deterioration when they were live or on.

The process according to the invention recommends the use of several similar systems having MOS components. These systems are switched on in turn. When one of the is live, the others are dead and can therefore recover their original characteristics. Thus, it is possible to increase the life of each of the systems and the circuit formed by all the systems fulfills its function for a prolonged period of tie.

More specifically, the present invention relates to a process for extending the operating period of a MOS component circuit exposed to gamma radiation.

This process is characterized in that the circuit incorporating at least two identical systems with MOS components consists of alternately switching on for a predetermined period each system constituting the said circuit, the on period being less than the threshold time beyond which the system in question is completely deteriorated and each live system is insulated from the remainder of the circuit.

The term system is understood to mean the range extending from an isolated component or a fraction of an integrated circuit up to the complex means constituted by a large number of components.

Such a circuit, constituted by several systems has, under gamma irradiation, an operating period greater than the sum of the operating periods of each of the systems considered in isolation.

Advantageously, the switching on time is less than the threshold tie beyond which the system is completely deteriorated. The threshold time is dependent on the system and dose rate to which the latter is exposed. It is found that low dose rates lead to a greater deterioration of systems than high dose rates.

A high dose rate leads to the generation of a large number of electronhole pairs and the charges present have a high recombination probability. However, for a low dose rate, recombination is less probable and gives rise to charge accumulations leading to the formation of internal, destructive electrical arcs.

In all cases, the switching off of a system well before the threshold time elapses makes it possible to obtain a complete recovery of the original characteristics. A system which is switched off is also isolated from the remainder of the circuit so as to prevent any untimely exchange of electrical charges.

According to a variant of the process, for each switching on of a system, there is an information exchange between the live system and the system which was previously live.

This variant essentially relates to complex systems such as microprocessors or microcontrollers. According to an advantageous embodiment, the operating periods of the different systems overlap. Thus, at the end of its operating phase, a system transmits the informations acquired or processed to the system which has just been switched on, which makes it possible to ensure an overall operational continuity.

According to another embodiment, the live system can write the informations which have to be transmitted into a memory, which is read as soon as the following system is switched on.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
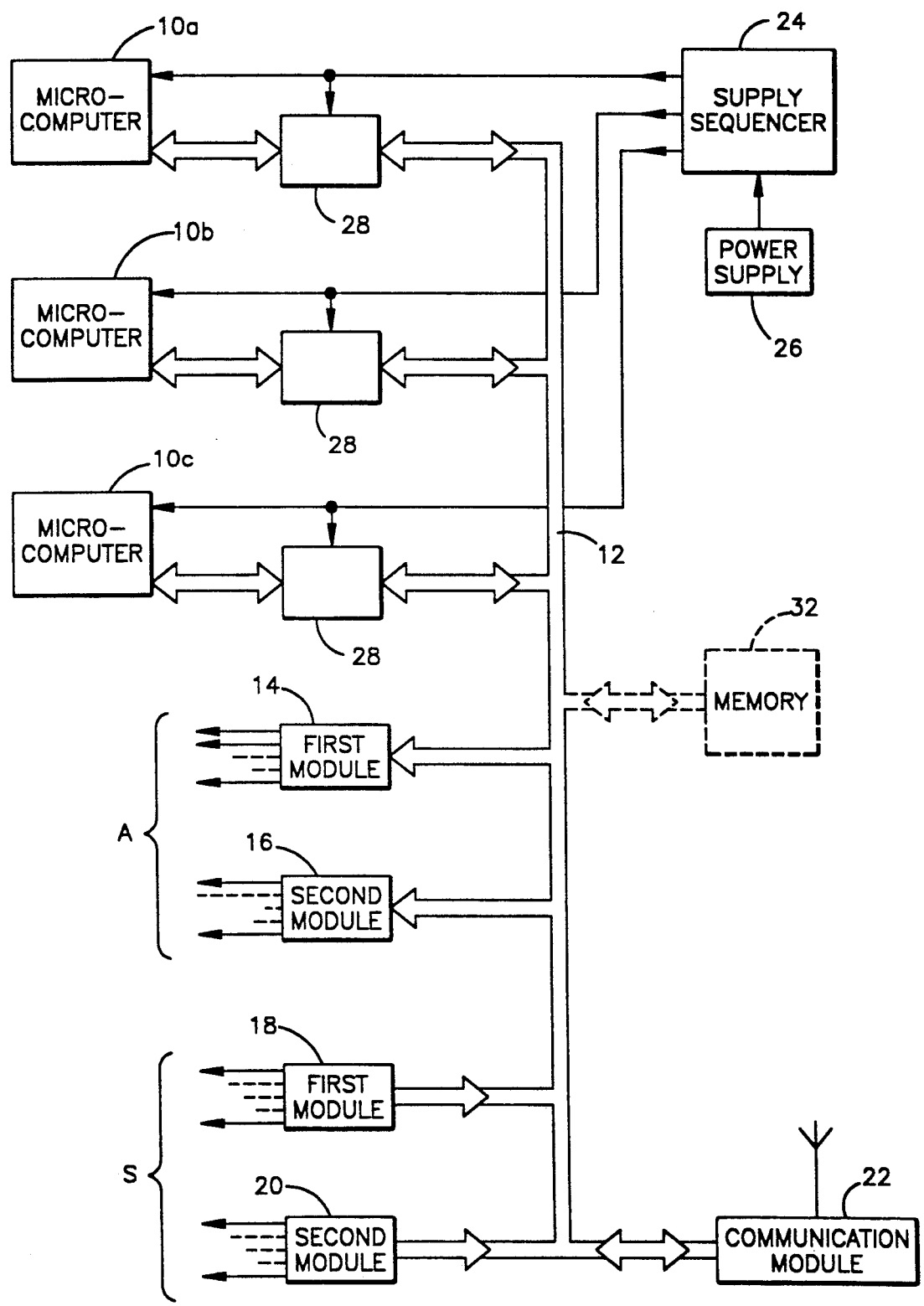
FIG. 1 Diagrammatically a circuit for performing the process according to the invention.

FIG. 1 diagrammatically shows a circuit having MOS components for performing the process according to the invention. This circuit can, for example, control the displacements and actions of an intervention robot in a nuclear power station. Such a robot is required to work in areas exposed to gamma radiation.

The circuit shown has three identical systems, three microcomputers 10a, 10b, 10c, constituted by a microcontroller, e.g. of type. CDP 68 EMO5C 4 marked by RCA and connected to a PROM of type HM1 6617-9 marketed by Harris.

Each of these microcomputers 10a, 10b, 10c is connected via a bus 12 to first and a second modules 14, 16 having an interface with actuators (not individually shown, but symbolized by the letter A) and to first and second modules 18, 20 having an interface with sensors (not individually shown, but symbolized by the letter S).

The first module 14 with an interface with the actuators has parallel logic outputs and permits the control of actuators, e.g. of the electrovalve type. The second module 16 having an interface with the actuators has analog outputs and makes it possible to control motor-type actuators, e.g. jacks.

The first module 18 with an interface with the sensors has parallel, logic inputs and permits the connection to sensors, e.g. of the switch type. The second module 20 having an interface with sensors has analog inputs and permits the connection to sensors of the e.g. dose rate, temperature, ultrasonic remote sensor type.

The bus 12 is also connected to an external communications module 22 permitting the connection by radio-transmission or cabled connection, to a not shown central computer.

A supply sequencer 24, e.g. a motorized cam system, is connected on the one hand to an electric power supply 26 and on the other to each of the microcomputers 10a, 10b, 10c. It makes it possible to switch on each of the microcomputers in alternating manner. An interface module 28 forming a switch makes it possible to isolate a microcomputer to which it is connected from the remainder of the circuit, when the microcomputer in question is switched off.

Figure 2:
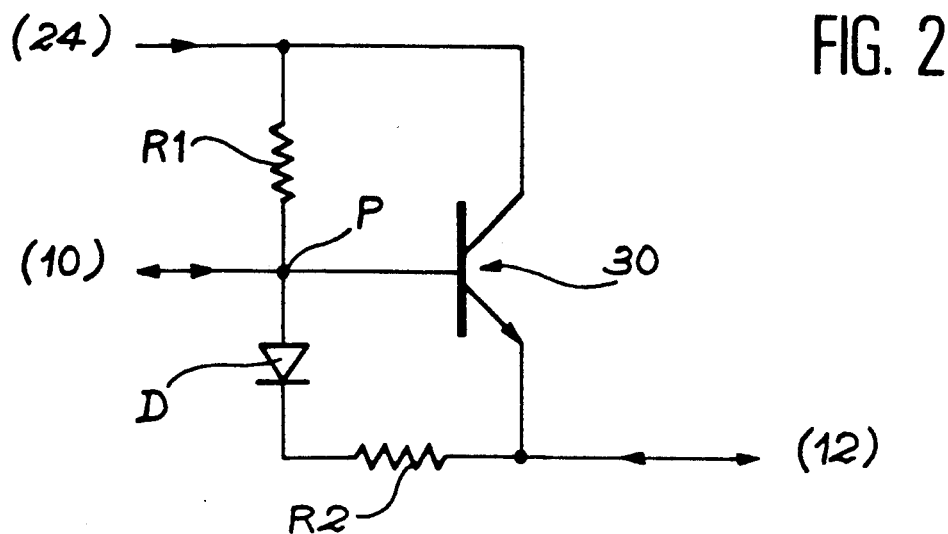
FIG. 2 Diagrammatically an electronic arrangement in the form of a switch.

FIG. 2 diagrammatically shows a known switch, which can be used in the module 28. Such a switch is connected to each of the wires of the bus 12 and to each of the ports of the microcomputer (designated 10 in FIG. 2).

This switch is mainly constituted by a transistor 30, e.g. of type 2N2222 operating in "saturated-blocked" manner. The port of the microcomputer computer 10 in question is connected at a point P to the base of the transistor 30. The collector of the transistor, connected to the sequencer 24, is connected to the point P across a resistor R1, e.g. of 100 kΩ. The emitter of the transistor, connected to the bus 12, is connected to the point P by a diode D, e.g. of type BAT 48 marketed by Thomson and connected in series with a resistor R2, e.g. of 4.7 kΩ.

When the power supply is interrupted by the sequencer 24, each switch independently isolates an input-/output port from the microcomputer in question.

Figure 3:
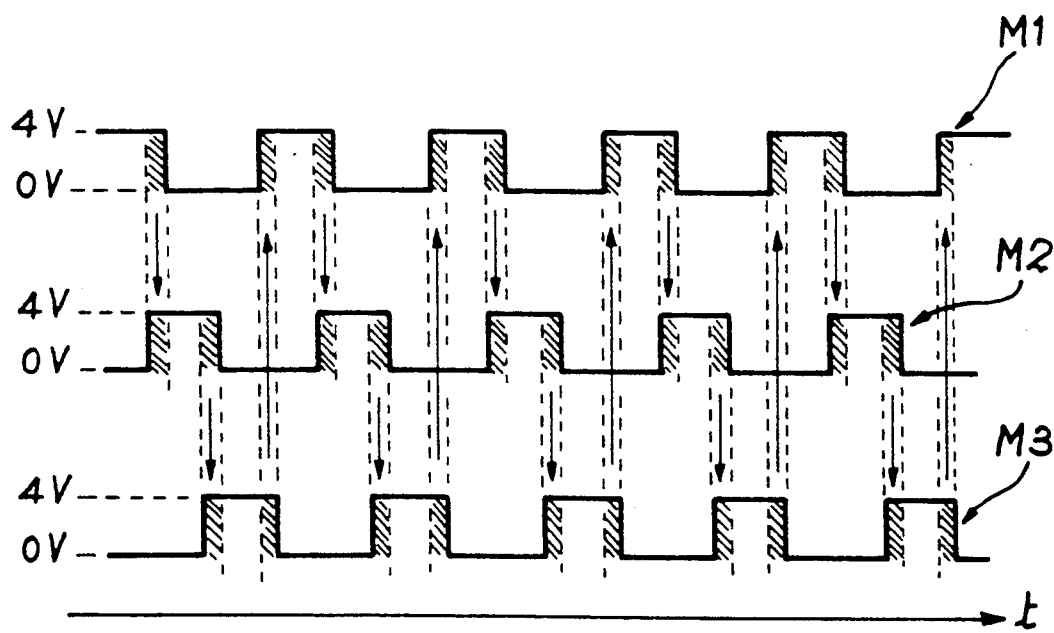
FIG. 3 Diagrammatically a supply sequence for the circuit of FIG. 1.

With reference to FIG. 3, a description will now be given of a supply sequence for the microcomputers 10a, 10b, 10c. The sequences M1, M2, M3 respectively relate to the microcomputers 10a, 10b, 10c. In turn, each microcomputer is switched on, e.g. under 4 V, for a predetermined period. The latter is dependent on the components used. It is below a threshold duration, determined by prior tests, as from which the components used are completely deteriorated by the gamma radiation to which they are exposed. Each supply period can e.g. last 10 m.

FIG. 3 shows that the supply, periods of the sequences M1, M2, M3 overlap (hatched areas). This tie during which two microcomputers are simultaneously live permits an information exchange and a transfer of instructions (symbolized by the arrows in FIG. 3) between the microcomputer which is going to be switched off and that which has just been switched on. This ensures a continuity in the operation of the robot controlled by the circuit.

On returning to FIG. 1, the dotted lines indicate a memory 32 connected to the bus 12 permitting an information exchange without it being necessary to have recourse to an overlap of the supply periods.

During their operating periods, the microcomputers write into the memory 32 the informations to be transmitted. As soon as a microcomputer is put into service, it reads the informations contained in the memory 32, so as to continue the command and control operations taking place. The reading/writing ties are sufficiently short to permit a virtual continuity in the said operations.

For a 500 rad/h dose rate, a circuit of the type shown in FIG. 1 (without out memory 32, but with a transfer of instructions during an overlap of the supply periods) is able to operate for an accumulated dose exceeding 100 krad (160 krad having been obtained during tests and 140 krad being a reproducibly obtained value), whereas a microcomputer used on a continuous basis is unable to reach 20 krad under the same irradiation conditions.

The circuit described hereinbefore is only given as a non-limitative embodiment. In particular, the number of identical systems (in this case three microcomputers) can vary as a function of the components chosen. It is also pointless to increase the number of systems beyond the recovery tie needs for each of the systems.

Other variants of the invention are also possible. For example, the duration of the supply periods is not necessarily fixed and can vary as a function of the dose rate to which the circuit is exposed. The duration of each period must be shorter if the dose rate increases. In this variant, a sensor makes it possible to measure the dose rate. A control device connected to the sensor and to the sequencer imposes the duration of the supply period as a function of the measurement. In this case, the sequencer must be chosen so that it permits variable tie supply periods.

The process according to the invention is applicable in preferred manner to all MOS components which, after preliminary irradiation tests without an electric supply, reveal that they recover their original characteristics relatively rapidly and at a temperature of 20° C.

The process according to the invention can be performed with MOS components of any type, such as NMOS, BS, CMOS and HCMOS, but also with logic circuits of the ACMOS type and even components of the CMOS/SOS type.

I claim:

1. Process for extending an operating period of a circuit having MOS components exposed to gamma radiation, the circuit having at least two identical MOS component systems (10A, 10B, 10C) said process comprising the steps of:

alternately switching on for a predetermined period each system constituting the said circuit, the on period being shorter than a threshold period beyond which the system is completely deteriorated; and, isolating each system which is switched off from the remainder of the circuit.

2. Process according to claim 1, further comprising the step of establishing, for each switching on of a system, an information exchange between the on system and the system which was previously on.

3. Process according to claim 2, wherein the information exchange takes place during an overlap of the on periods.

4. Process according to claim 2, wherein the information exchange takes place by writing information to be exchanged into an intermediate memory (32) and then reading of said memory (32) by the system which has just been switched on.

* * * * *

UNITED STATES PATENT AND TRADEMARK OFFICE
CERTIFICATE OF CORRECTION

PATENT NO. : 5,287,361

DATED : February 15, 1994

INVENTOR(S) : Francis Joffre

It is certified that error appears in the above-identified patent and that said Letters Patent is hereby corrected as shown below:

Column 1, line 25, delete "shire" and insert --sapphire--; and line 27, delete "ties" and insert --times--.

Column 2, line 4, delete "the" (first occurrence) and insert --them--;

line 8, delete "tie" and insert --time--; and line 29, delete "tie" and insert --time--.

Column 3, line 15, after "10c," insert --each--;

line 16, after "type" delete --.-- (period);

line 20, delete "a" (second occurrence); and line 60, delete "computer".

Column 4, line 15, delete "," (comma);

line 16, delete "tie" and insert --time--;

line 33, delete "ties" and insert --times--;

line 37, delete "out";

line 50, delete "tie" and insert --time--;

UNITED STATES PATENT AND TRADEMARK OFFICE
CERTIFICATE OF CORRECTION

PATENT NO. : 5,287,361

DATED : February 15, 1994

INVENTOR(S) : Francis Joffre

It is certified that error appears in the above-identified patent and that said Letters Patent is hereby corrected as shown below:

Column 4, line 58, delete "period" and insert --periods--; and line 60, delete "tie" and insert --time--.

Column 5, line 1, delete "BS," and insert --PMOS,--.

Signed and Sealed this

Ninth Day of August, 1994

Attest:

BRUCE LEHMAN

Attesting Officer      Commissioner of Patents and Trademarks